(12) United States Patent
Naito (10) Patent No.: US 9,495,203 B2
(45) Date of Patent: Nov. 15, 2016

(54) APPARATUS FOR SELECTING AND DISPLAYING AN OPERATION USER INTERFACE AND METHOD AND NON-TRANSITORY COMPUTER READABLE MEDIUM FOR CONTROLLING THE SAME

(71) Applicant: FUJI XEROX CO., LTD., Minato-ku, Tokyo (JP)

(72) Inventor: Yoshiyuki Naito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 216 days.

(21) Appl. No.: 13/768,099

(22) Filed: Feb. 15, 2013

(65) Prior Publication Data

US 2014/0019976 A1    Jan. 16, 2014

(30) Foreign Application Priority Data

Jul. 10, 2012    (JP) ................. 2012-154503

(51) Int. Cl.
G06F 3/00      (2006.01)
G06F 9/48      (2006.01)
G06F 3/0488    (2013.01)
G06F 3/0481    (2013.01)

(52) U.S. Cl.
CPC .............. *G06F 9/48* (2013.01); *G06F 3/0481* (2013.01); *G06F 3/04886* (2013.01); *G06F 9/4843* (2013.01); *G06F 2209/482* (2013.01)

(58) Field of Classification Search
None
See application file for complete search history.

(56) References Cited

U.S. PATENT DOCUMENTS

| 2003/0074647 A1 | 4/2003 | Andrew |
| 2005/0091032 A1* | 4/2005 | Haluptzok et al. ............... 704/4 |
| 2007/0013673 A1* | 1/2007 | Minari ........................... 345/173 |
| 2010/0115447 A1* | 5/2010 | Kuo et al. ...................... 715/773 |
| 2011/0087990 A1* | 4/2011 | Ng et al. ........................ 715/773 |
| 2012/0127078 A1 | 5/2012 | Vecera et al. |
| 2013/0082940 A1* | 4/2013 | Mainwaring et al. ........ 345/173 |
| 2013/0174079 A1* | 7/2013 | Morley et al. ................ 715/773 |
| 2013/0283195 A1* | 10/2013 | Bilgen et al. ................ 715/767 |
| 2014/0019976 A1* | 1/2014 | Naito ............................ 718/100 |

FOREIGN PATENT DOCUMENTS

| JP | 2000-148334 A | 5/2000 |
| JP | 2004-302684 A | 10/2004 |
| JP | 2010-152598 A | 7/2010 |

OTHER PUBLICATIONS

On-screen Input Methods Dianne Hackborn Android Developer's Blog Published: Apr. 21, 2009.*
Creating an Input Method Amith Yamasani Android Developer's Blog Published: Apr. 22, 2009.*

(Continued)

*Primary Examiner* — Emerson Puente
*Assistant Examiner* — Paul Mills
(74) *Attorney, Agent, or Firm* — Sughrue Mion, PLLC (57) ABSTRACT

An information processing apparatus includes an inclusion relation memory, a correspondence relation memory, a data type identifying unit, a software application identifying unit, and a display controller. The inclusion relation memory stores inclusion relation between multiple data types. The correspondence relation memory stores correspondence relation between the data types and software applications used in input of data. The data type identifying unit analyzes acquired information to identify a data type corresponding to an input area of the acquired information. The software application identifying unit identifies a software application corresponding to each data type included in the identified data type in accordance with the inclusion relation and the correspondence relation. The display controller displays a display part in which the identified software application is used in a display.

14 Claims, 8 Drawing Sheets

| DATA TYPE | INPUT DEVICE |
|---|---|
| CHARACTER STRING TYPE | VIRTUAL KEYBOARD |
| MAIL ADDRESS TYPE | ADDRESS BOOK |
| TELEPHONE NUMBER TYPE | ADDRESS BOOK |
| URL TYPE | ADDRESS BOOK |
| | BOOKMARK |
| NUMERIC VALUE TYPE | VIRTUAL NUMERIC KEYPAD |
| | CALCULATOR |
| CURRENCY TYPE | CURRENCY CONVERTER |

(56) References Cited

OTHER PUBLICATIONS

Tree (data structure) From Wikipedia, the free encyclopedia Published: No later than Mar. 28, 2016.*

Office Action issued by Australian Patent Office in corresponding Australian Patent Application No. 2013201894, dated Jun. 17, 2014.
Office Action issued by Australian Patent Office in corresponding Australian Patent Application No. 2013201894, dated Sep. 8, 2015.

* cited by examiner

| DATA TYPE | INPUT DEVICE |
|---|---|
| CHARACTER STRING TYPE | VIRTUAL KEYBOARD |
| MAIL ADDRESS TYPE | ADDRESS BOOK |
| TELEPHONE NUMBER TYPE | ADDRESS BOOK |
| URL TYPE | ADDRESS BOOK |
| | BOOKMARK |
| NUMERIC VALUE TYPE | VIRTUAL NUMERIC KEYPAD |
| | CALCULATOR |
| CURRENCY TYPE | CURRENCY CONVERTER |

APPARATUS FOR SELECTING AND DISPLAYING AN OPERATION USER INTERFACE AND METHOD AND NON-TRANSITORY COMPUTER READABLE MEDIUM FOR CONTROLLING THE SAME

CROSS-REFERENCE TO RELATED APPLICATIONS

This application is based on and claims priority under 35 USC 119 from Japanese Patent Application No. 2012-154503 filed Jul. 10, 2012.

BACKGROUND (i) Technical Field

The present invention relates to an information processing apparatus, an information processing method, and a non-transitory computer readable medium.

(ii) Related Art

Various mechanisms used to input data, such as character strings, are proposed. In HyperText Markup Language 5 (HTML5), type information is specified for an input field tag in a manner in which <input type="email"> to select an appropriate input device from input devices (a virtual keyboard, an address book, etc.) and display the selected input device.

SUMMARY

According to an aspect of the invention, there is provided an information processing apparatus including an inclusion relation memory, a correspondence relation memory, a data type identifying unit, a software application identifying unit, and a display controller. The inclusion relation memory stores inclusion relation between multiple data types. The correspondence relation memory stores correspondence relation between the data types and software applications used in input of data. The data type identifying unit analyzes acquired information that is acquired to identify a data type corresponding to an input area of the acquired information. The software application identifying unit identifies a software application corresponding to each data type included in the data type identified by the data type identifying unit in accordance with the inclusion relation stored in the inclusion relation memory and the correspondence relation stored in the correspondence relation memory. The display controller displays a display part in which the software application identified by the software application identifying unit is used in a display.

BRIEF DESCRIPTION OF THE DRAWINGS

Exemplary embodiments of the present invention will be described in detail based on the following figures, wherein.

DETAILED DESCRIPTION

Configuration

Figure 1:
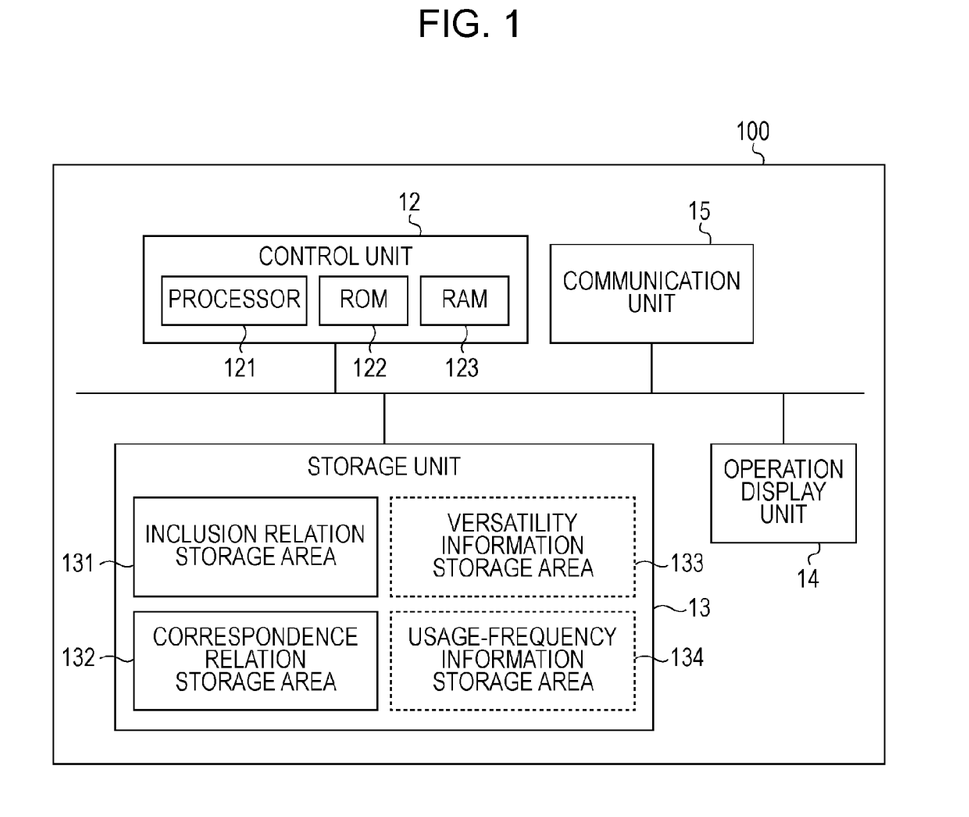
FIG. 1 is a block diagram illustrating an example of the configuration of an information processing apparatus according to an exemplary embodiment of the invention.

FIG. 1 is a block diagram illustrating an example of the configuration of an information processing apparatus 100 according to an exemplary embodiment of the invention. The information processing apparatus 100 is, for example, a smartphone, a mobile phone, or a tablet computer. As illustrated in FIG. 1, each component in the information processing apparatus 100 is connected to a bus 11. Data is exchanged between the components via the bus 11. In the present exemplary embodiment, the information processing apparatus 100 reads a document described in a markup language, such as HTML5, to execute a variety of processing in accordance with the content of the document. Referring to FIG. 1, a control unit 12 includes a processor 121, such as a central processing unit (CPU), a read only memory (ROM) 122, and a random access memory (RAM) 123. The control unit 12 controls the information processing apparatus 100 in accordance with computer programs stored in the ROM 122 or a storage unit 13. The storage unit 13 is a storage device, such as a hard disk. Various programs including programs concerning the control of the information processing apparatus 100 are stored in the storage unit 13. An operation display unit 14 (an example of a display and an operation unit) is provided with a liquid crystal display functioning as a touch panel. A user of the information processing apparatus 100 touches the liquid crystal display to perform various operations. A communication unit 15 is an interface to communicate with another apparatus in a wired manner or wirelessly.

The storage unit 13 includes an inclusion relation storage area 131 and a correspondence relation storage area 132. Information (hereinafter referred to as "inclusion relation information") indicating the inclusion relation between data types that may be specified for the input field tag (<input type="">) of HTML5 is stored in the inclusion relation storage area 131.

Figure 2:
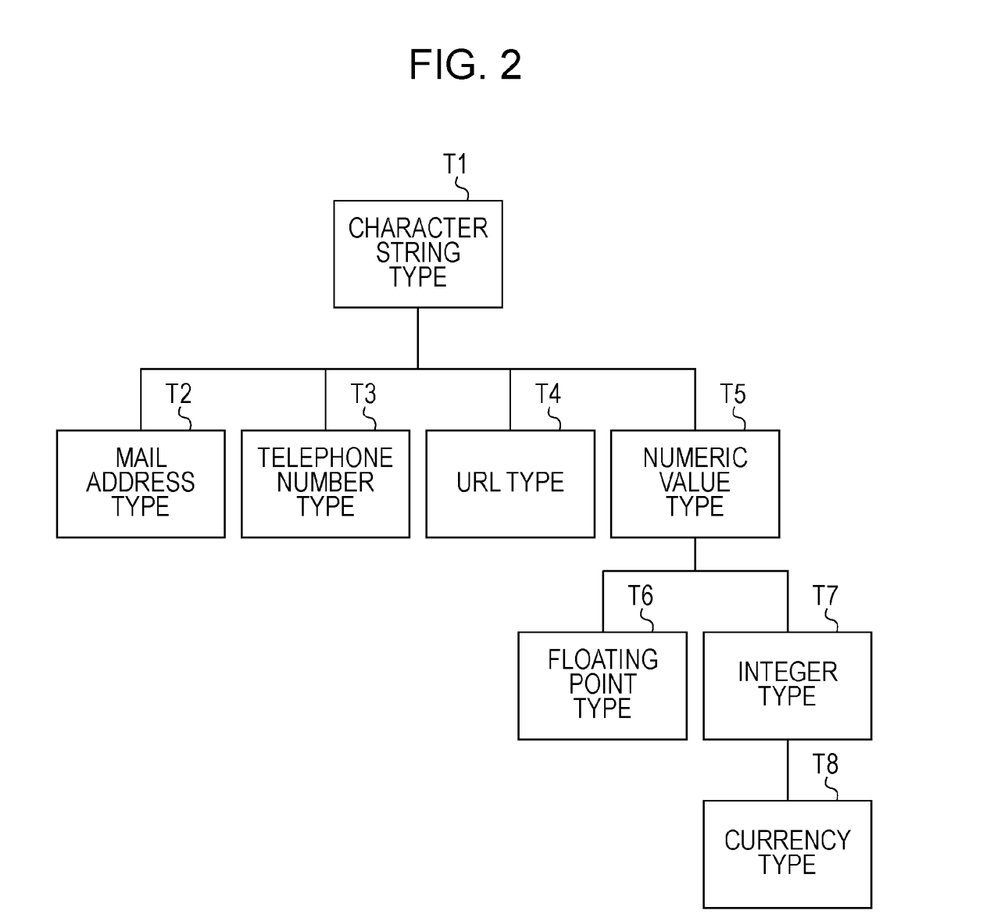
FIG. 2 illustrates an example of the content of inclusion relation information stored in an inclusion relation storage area.

FIG. 2 illustrates an example of the content of the inclusion relation information stored in the inclusion relation storage area 131. In the example illustrated in FIG. 2, the inclusion relation between multiple data types T1, T2, ..., and T8 is indicated by using a tree structure. The data types T1, T2, ..., and T8 are specified by the markup language. The upper data types have higher levels of versatility and the lower data types have limited applications in the example illustrated in FIG. 2. Specifically, the character string type T1 includes the other data types T2 to T8. The numeric value type T5 includes the floating point type T6, the integer type T7, and the currency type T8, as illustrated in FIG. 2. The inclusion relation information may be any information as long as the information indicates the inclusion relation between the data types T1, T2, ..., and T8. Specifically, for example, the inclusion relation information may indicate the inheritance relation between the data types using a pointer or may represent the correspondence relation between a data type and each data type included in the data type using a table.

Figure 3:
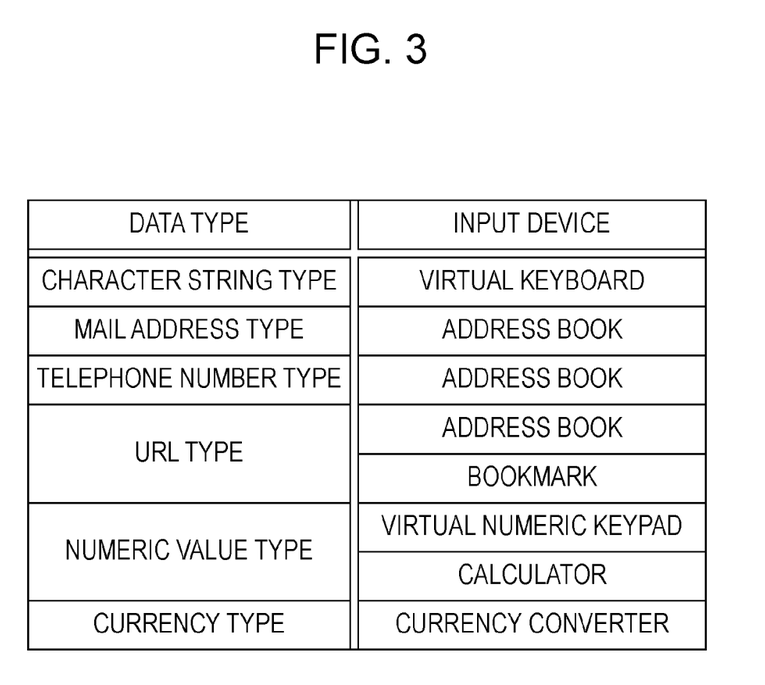
FIG. 3 illustrates an example of the content of a correspondence table stored in a correspondence relation storage area.

The correspondence relation between the data types and software applications (hereinafter referred to as "input software applications") used as input devices of data is stored in the correspondence relation storage area 132. In the present exemplary embodiment, a table (hereinafter referred to as a "correspondence table") representing the correspondence relation between the kinds of the data types and the input software applications is stored in the correspondence relation storage area 132. FIG. 3 illustrates an example of the content of the correspondence table. As illustrated in FIG. 3, the items in "data type" and "input device" are stored in the correspondence table in association with each other. Among these items, information indicating the kind of each data type is stored in the items in "data type" and information indicating the kind of each input software application used as the input device is stored in the items in "input device." Specifically, for example, a "virtual keyboard" input software application is associated with the "character string type." An "address book" input software application is associated with the "mail address type" and the "telephone number type." Two input software applications including the "address book" input software application and a "bookmark" input software application are associated with the "URL type." Two input software applications including a "virtual numeric keypad" input software application and a "calculator" input software application are associated with the "numeric value type." A "currency converter" input software application is associated with the "currency type."

The "virtual keyboard" input software application has a function to realize a virtual keyboard on a touch panel. The "address book" input software application has a function to display a list of mail addresses or a list of telephone numbers. The "bookmark" input software application has a function to display a list of Uniform Resource Locators (URLs) that is book-marked. The "virtual numeric keypad" input software application has a function to virtually realize a numeric keypad on the touch panel. The "calculator" input software application has a function to virtually realize a calculator on the touch panel. The "currency converter" input software application has a function to display a currency converter on the touch panel.

Figure 4:
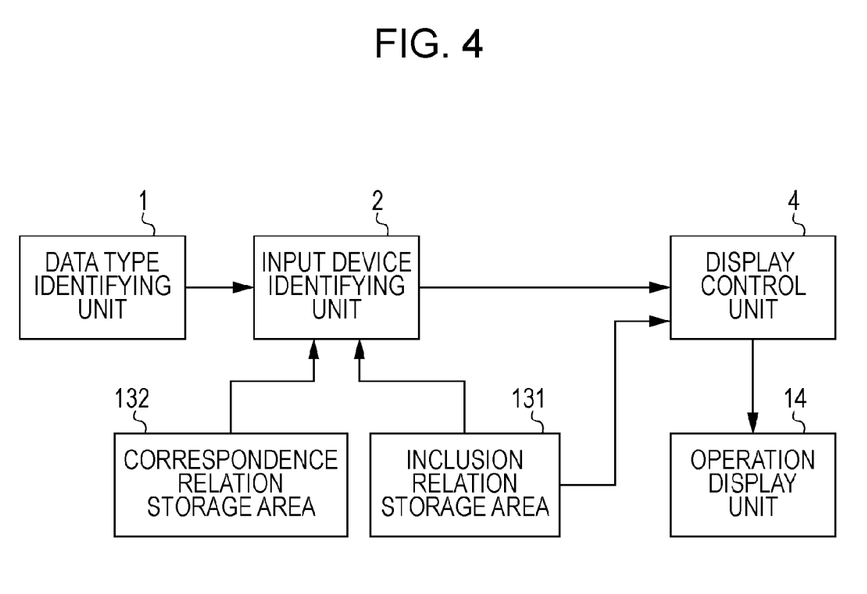
FIG. 4 is a block diagram illustrating an example of the functional configuration of the information processing apparatus.

The functional configuration of the information processing apparatus 100 will now be described with reference to FIG. 4. FIG. 4 is a block diagram illustrating an example of the functional configuration of the information processing apparatus 100. Referring to FIG. 4, a data type identifying unit 1, an input device identifying unit 2, and a display control unit 4 are realized by the control unit 12 that reads out the computer programs stored in the ROM 122 or the storage unit 13 to execute the computer programs that are read out. Arrows in FIG. 4 schematically indicate flows of data. The data type identifying unit 1 acquires a piece of content (an example of acquired information) described in the markup language to identify the kind of the data type (the data type corresponding to an input area of the acquired information) specified by the acquired piece of content (text file). In the present exemplary embodiment, the data type identifying unit 1 acquires information (input data type specifying information) specifying the data type specified by the <input type> tag of HTML5.

The input device identifying unit 2 (an example of a software application identifying unit) identifies the input software application corresponding to each data type included in the data type identified by the data type identifying unit 1 in accordance with the inclusion relation stored in the inclusion relation storage area 131 and the correspondence relation stored in the correspondence relation storage area 132. Specifically, in the present exemplary embodiment, the input device identifying unit 2 first identifies each data type included in the data type identified by the data type identifying unit 1 in accordance with the inclusion relation information stored in the inclusion relation storage area 131. Then, the input device identifying unit 2 identifies the input software application corresponding to the identified data type in accordance with the correspondence table stored in the correspondence relation storage area 132.

More specifically, for example, when the data type identified by the data type identifying unit 1 is the "character string type", the input device identifying unit 2 identifies the data types included in the "character string type", that is, the "character string type", the "mail address type", the "telephone number type", the "URL type", the "numeric value type", the "floating point type", the "integer type", and the "currency type" to identify the input software applications corresponding to the identified data types, that is, the "virtual keyboard", the "address book", the "bookmark", the "virtual numeric keypad", the "calculator", and the "currency converter." For example, when the data type identified by the data type identifying unit 1 is the "numeric value type", the input device identifying unit 2 identifies the data types included in the "numeric value type", that is, the "numeric value type", the "floating point type", the "integer type", and the "currency type" to identify the input software applications corresponding to the data types, that is, the "virtual numeric keypad", the "calculator", and the "currency converter."

The display control unit 4 selects one or more software applications from the input software applications identified by the input device identifying unit 2 in accordance with a predetermined algorithm. In the present exemplary embodiment, the display control unit 4 selects the input software applications corresponding to the data type an inclusion range of which meets a predetermined condition. Specifically, the display control unit 4 selects the input software application corresponding to the uppermost data type in the inheritance tree illustrated in FIG. 2 as the input software application that is to be first displayed on the screen (hereinafter referred to as a "default display software application") and selects the input software applications that are searched second and third in the search from the top, among the input software applications corresponding to the second and subsequent data types in the inheritance tree, as the input software applications that are to be displayed as buttons (hereinafter referred to as "sub-display software applications").

More specifically, for example, when the "character string type" is identified by the data type identifying unit 1, the display control unit 4 selects the "virtual keyboard", which is the input software application corresponding to the "character string type", as the default display software application and selects the two input software applications: the "address book", which is the input software application corresponding to the "mail address type", the "telephone number type", and the "URL type", and the "calculator", which is the input software application corresponding to the "numeric value type", as the sub-display software applications. When multiple input software applications corresponds to one data type (for example, the "numeric value type" and the "URL type"), the display control unit 4 selects any of the input software applications in accordance with a predetermined algorithm. Specifically, for example, priorities may be set for the input software applications and the display control unit 4 may select the input software applications in accordance with their priorities.

Figure 5:
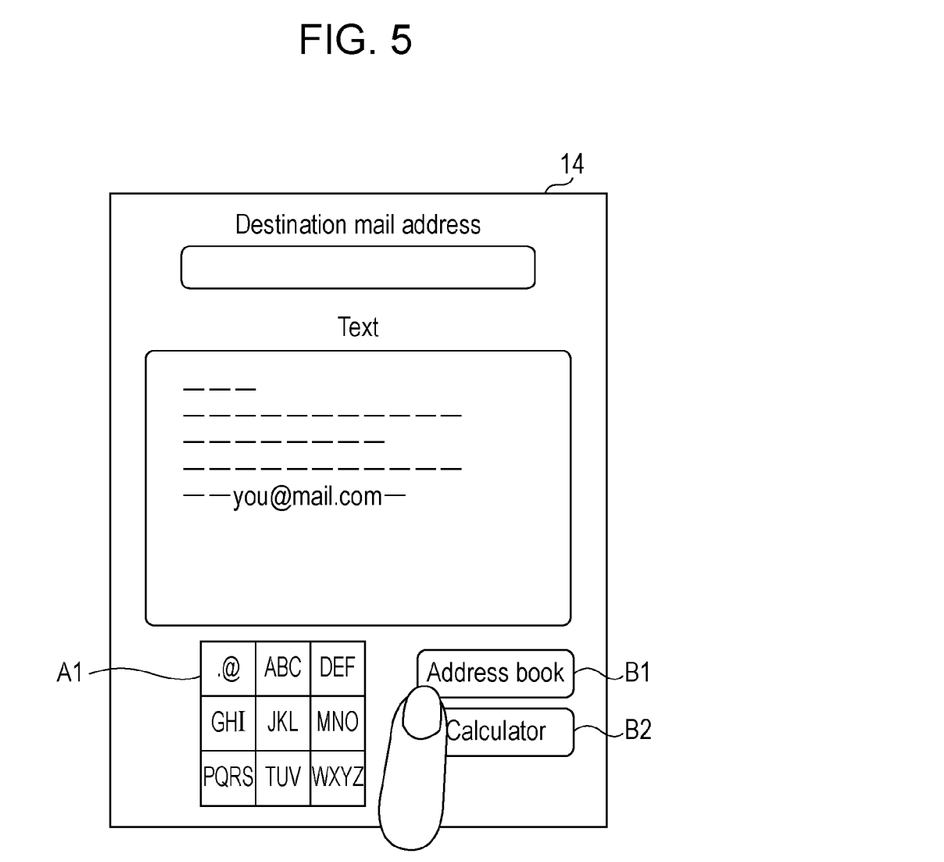
FIG. 5 illustrates an exemplary screen displayed in an operation display unit.

In addition, the display control unit 4 displays display parts (an operation user interface, a button, etc.) in which the selected input software applications are used in the operation display unit 14. FIG. 5 illustrates an example of the display parts displayed by the display control unit 4. In the example illustrated in FIG. 5, the display control unit 4 activates the "virtual keyboard" software application selected as the default display software application and displays an operation user interface A1 (the display part that accepts data input by an operation by the user) for the activated software application in the operation display unit 14. The display control unit 4 also displays a button B1 for activating the "address book" software application selected as the sub-display software application (for switching the display of the input screen to the "address book" software application) and a button B2 for activating the "calculator" software application (for switching the display of the input screen to the "calculator" software application) in the operation display unit 14.

The user inputs data in accordance with the screen displayed in the operation display unit 14. Specifically, for example, the user inputs data, such as a "character string", with the operation user interface A1 of the "virtual keyboard" software application. The operation display unit 14 outputs information corresponding to the content of the operation by the user. The control unit 12 accepts the input of the data in accordance with the information output from the operation display unit 14 to perform a variety of processing, such as the display of the input character string. In addition, the user presses the button B1 to activate the "address book" software application or presses the button B2 to activate the "calculator" software application. Specifically, for example, when information indicating that the button B1 is pressed (selected) is output from the operation display unit 14, the control unit 12 activates the "address book" software application to switch the operation user interface (the display part accepting data input by the user) to be displayed in the operation display unit 14 from the "virtual keyboard" to the "address book." The control unit 12 may end the "virtual keyboard" input software application or may suspend the "virtual keyboard" input software application, instead of ending the "virtual keyboard" input software application.

Figure 6:
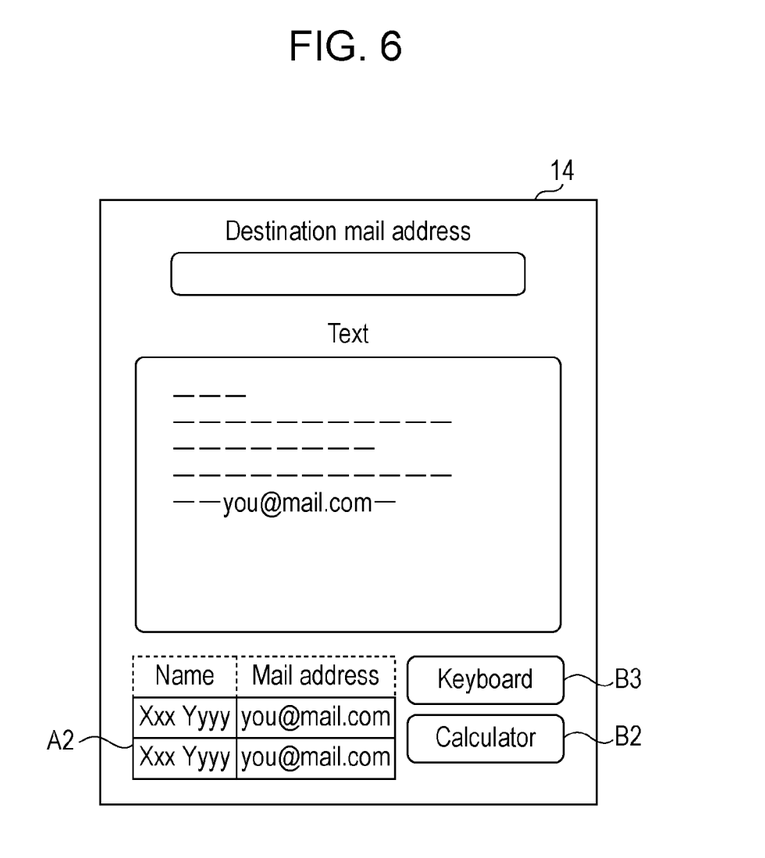
FIG. 6 illustrates another exemplary screen displayed in the operation display unit.

FIG. 6 illustrates an exemplary screen displayed when the button B1 is pressed by the user in the example in FIG. 5. In the example illustrated in FIG. 6, in response to pressing of the button B1, an address book list A2 is displayed in the operation display unit 14 by the "address book" input software application, and a button B3 for activating the "virtual keyboard" input software application (that is, for switching the content of display in the display area where the address book list A2 is displayed) and the button B2 for activating the "calculator" input software application are displayed in the operation display unit 14. The user performs an operation, such as a copy and paste operation, for an address displayed in the address book list A2 on the screen illustrated in FIG. 6 to input the address.

Figure 8:
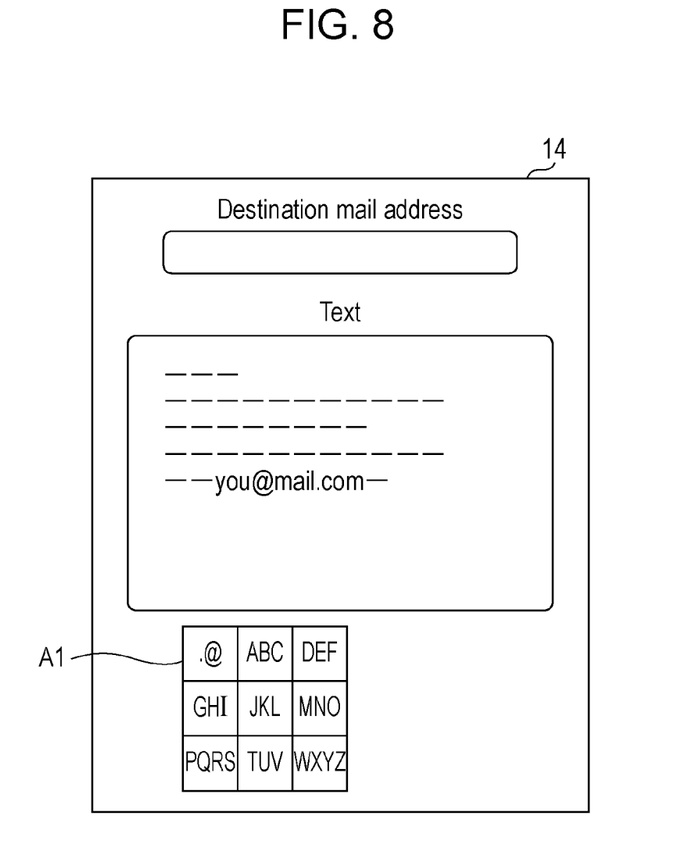
FIG. 8 illustrates an exemplary screen displayed in an apparatus in related art.

FIG. 8 illustrates an example of a screen displayed in an apparatus in related art. As illustrated in FIG. 8, only the user interface (the operation user interface A1 for the "virtual keyboard" input software application) corresponding to the data type specified by the <input type> tag is displayed and an image, such as a button, for switching to another input software application is not displayed in the apparatus in the related art. Accordingly, it is necessary for the user to perform a series of operations including activation of an address book or a browser, copying and pasting of an address or a URL, and closing of the activated address book or the browser each time the user wants to input a mail address, a URL, or the like in the apparatus in the related art. These operations are usually complicated. In contrast, in the present exemplary embodiment, for example, when the user wants to input a mail address in the screen illustrated in FIG. 5, the display is switched to the address book in response to pressing of the button B1 displayed on the screen. As described above, it is possible to easily activate each software application other than the input software application corresponding to the data type specified by the <input type> tag in the present exemplary embodiment.

Operation

Figure 7:
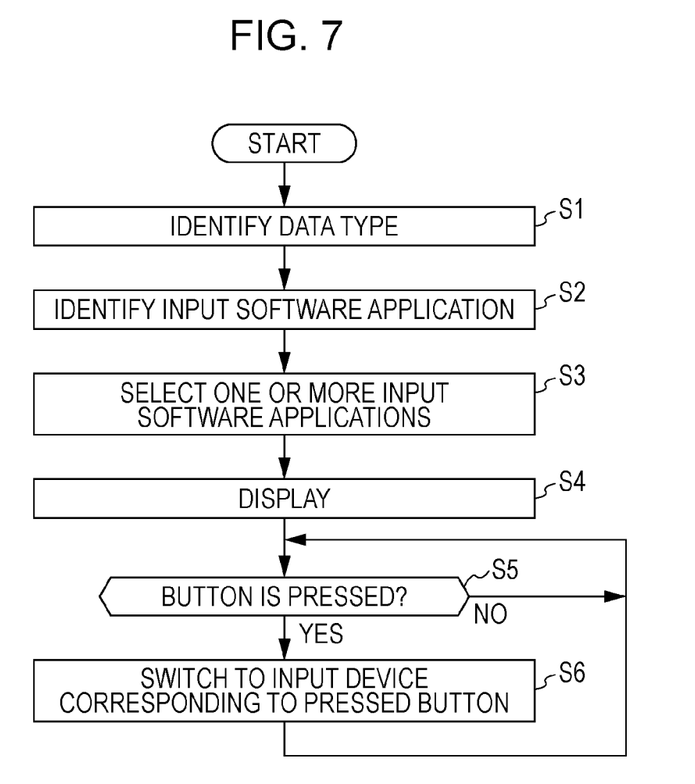
FIG. 7 is a flowchart illustrating an example of a process performed by the information processing apparatus.

FIG. 7 is a flowchart illustrating an example of a process performed by the control unit 12 in the information processing apparatus 100. The process illustrated in FIG. 7 is executed in response to acquisition of a piece of content described in the markup language by the control unit 12. Referring to FIG. 7, in Step S1, the control unit 12 analyzes the piece of content described in the markup language to identify the data type specified as the <input type> tag. In Step S2, the control unit 12 identifies the input software application corresponding to each data type included in the identified data type in accordance with the inclusion relation stored in the inclusion relation storage area 131 and the correspondence relation stored in the correspondence relation storage area 132. In Step S3, the control unit 12 selects one or more input software applications from the identified input software applications in accordance with a predetermined algorithm.

In Step S4, the control unit 12 displays an image corresponding to each input software application that is selected in the operation display unit 14. Specifically, the control unit 12 displays an image corresponding to the input software application selected as the default display software application in the operation display unit 14 and displays the button for activating each input software application selected as the sub-display software application in the operation display unit 14.

The user inputs data in accordance with the screen displayed in the operation display unit 14. When the user wants to input a mail address, the user may directly input the mail address with the virtual keyboard or may press the button B1 for activating the address book to activate the address book.

Upon pressing of the button B1 or the button B2 by the user, the operation display unit 14 outputs information corresponding to the content of the operation. In step S5, the control unit 12 determines whether the button B1 or the button B2 is pressed in accordance with the information output from the operation display unit 14. If the control unit 12 determines that the button B1 or the button B2 is pressed (YES in Step S5), in Step S6, the control unit 12 activates the input software application corresponding to the pressed button. Specifically, for example, when the button B1 is pressed in the example illustrated in FIG. 5, the control unit 12 activates the address book and displays an image corresponding to the address book in the operation display unit 14. As described above, in the present exemplary embodiment, since the button B1 and the button B2 for switching to the input software applications other than the input software application corresponding to the data type specified by the <input type> tag of HTML5 are displayed in the operation display unit 14, it is possible to easily switch to another input software application.

Modifications

While the invention is described in terms of some specific examples and embodiments, it will be clear that this invention is not limited to these specific examples and embodiments and that many changes and modifications will be obvious to those skilled in the art without departing from the spirit and scope of the invention. The following modifications may be combined with each other.

(1) Although the display control unit 4 selects one or more input software applications corresponding to the data type the inclusion range of which meets a predetermined condition in the above exemplary embodiments, the mode of selecting the input software applications is not limited to this. For example, the display control unit 4 may select the input software applications to be displayed in the operation display unit 14 on the basis of the level of versatility of each data type. In this case, specifically, a versatility information storage area 133 (illustrated by a dotted line in FIG. 1) that stores versatility information indicating the level of versatility of each data type may be provided in the storage unit 13 in the information processing apparatus 100. The display control unit 4 may sort the input software applications identified by the input device identifying unit 2 on the basis of the versatility information about the data types corresponding to the respective input software applications to select one or more input software applications in accordance with the result of the sorting. More specifically, the display control unit 4 may select the input software application having the highest level of versatility indicated by the versatility information as the default display software application and may select the input software applications having the second and third levels of versatility as the sub-display software applications.

In another mode of selecting the input software applications, for example, the display control unit 4 may select the input software applications to be displayed in the operation display unit 14 on the basis of the usage frequency of each data type. In this case, specifically, a usage-frequency information storage area 134 (illustrated by a dotted line in FIG. 1) that stores usage-frequency information indicating the usage frequency of each data type may be provided in the storage unit 13 in the information processing apparatus 100. The display control unit 4 may sort the input software applications identified by the input device identifying unit 2 on the basis of the usage-frequency information about the data types corresponding to the respective input software applications to select one or more input software applications in accordance with the result of the sorting. More specifically, the display control unit 4 may select the input software application having the highest usage frequency indicated by the usage-frequency information as the default display software application and may select the input software applications having the second and third usage frequencies as the sub-display software applications.

In another mode, for example, the display control unit 4 may select one or more input software applications on the basis of the display size of the button for activating each input software application identified by the input device identifying unit 2 and the size of the display area of the buttons. Specifically, for example, the display control unit 4 may select the input software applications on the basis of the size of the button corresponding to each input software application and the size of the display area of the buttons so that the number of buttons to be displayed in the display area meets a predetermined condition.

As described above, various modes of selecting the input software applications may be applied. Any mode of selecting the input software applications may be used as long as the display control unit 4 selects one or more software applications from the software applications identified by the input device identifying unit 2 in accordance with a predetermined algorithm.

Although the display control unit 4 selects one or more software applications from the software applications identified by the input device identifying unit 2 in the above exemplary embodiments, the display control unit 4 may not select the software applications. That is, the display part corresponding to each software application identified by the input device identifying unit 2 may be displayed in the operation display unit 14 in the configuration in which the display control unit 4 does not select the software applications.

(2) Although the display control unit 4 selects one default display software application and two sub-display software applications in the above exemplary embodiments, the numbers of the input software applications that are selected is not limited to the above ones. For example, the display control unit 4 may select one default display software application and three sub-display software applications. In another mode, for example, the display control unit 4 may select the input software applications the levels of versatility of which are higher than or equal to a predetermined threshold value (an arbitrary number of input software applications may be selected). It is sufficient for the display control unit 4 to select one or more software applications from the software applications identified by the input device identifying unit 2 in accordance with a predetermined algorithm.

(3) Although HTML5 is exemplified as the markup language analyzed by the information processing apparatus 100 in the above exemplary embodiments, the markup language is not limited to HTML5. For example, another markup language, such as Wireless Markup Language (WML), may be analyzed by the information processing apparatus 100.

Although the input of a character string is mainly described in the above exemplary embodiments, the data input into the information processing apparatus 100 is not limited to the data representing a character string and may be data representing an image. The data indicated by the data type according to the exemplary embodiment of the invention is not limited to a character string and may include other data, such as an image.

(4) The content of storage in the inclusion relation storage area 131 and the correspondence relation storage area 132 may be changed by the user in the above exemplary embodiment. Specifically, the control unit 12 may perform processes of changing the content of storage, such as registration of the data types in the correspondence relation storage area 132, deletion of the registered data types, registration of the input software applications, and deletion of the registered input software applications, in accordance with the information output from the operation display unit 14. Alternatively, the control unit 12 may change the inclusion relation stored in the inclusion relation storage area 131 in accordance with the information output from the operation display unit 14.

(5) The programs stored in the ROM 122 or the storage unit 13 described above may be provided in a state in which the programs are stored on a computer-readable recording medium, such a magnetic recording medium (a magnetic tape, a magnetic disk (hard disk drive (HDD)), a flexible disk (FD), etc.), an optical recording medium (an optical disk, etc.), a magneto-optical recording medium, or a semiconductor memory. Alternatively, the programs may be downloaded into the information processing apparatus 100 via a communication line, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus for displaying an operation user interface comprising:
    an operation display unit;
    a correspondence memory configured to store correspondence information between a plurality of related data types and a plurality of applications, wherein each data type represents a type of data which may be specified for entry in one or more input areas of a graphical user interface of the operation display unit and each application is operable to enter data into the input areas, wherein a correspondence between an application and a data type indicates the application is capable of entering data of that data type;
    an inclusion relation memory configured to store inclusion relation information of the plurality of related data types in a tree structure, wherein each application which corresponds to a particular data type in the tree is operable to enter data of each data type which is a descendent of the particular data type in the tree in addition to data of the particular data type, and wherein none of the applications correspond to multiple data types that are at more than one level of the tree;
    a data type identifying unit configured to acquire information associated with a first input area of the input areas to identify a data type specified by the acquired information;
    a software application identifying unit configured to identify the application corresponding to the identified data type and the applications corresponding respectively to the descendants of the identified data type in the tree using the correspondence information and the inclusion relation information; and
    a display controller configured to select a subset of the identified applications for display, the selecting comprising selecting one of the identified applications as a default display application and two or more other of the identified applications as sub-display applications,
    wherein the display controller is further configured to concurrently display display parts for the selected applications in the operation display unit, the display parts including an operation user interface display part of the default display application and an activation display part for each of the sub-display applications, wherein display parts for unselected applications are not displayed.

2. The information processing apparatus according to claim 1, when information indicating that one of the activation display parts has been selected by a user is output from the operation display unit, an operation user interface display part of the sub-display application is activated and enabled to accept data input by an operation of the user.

3. The information processing apparatus according to claim 1, further comprising:
    a content-of-storage changing unit configured to perform, based on an operation by a user, at least one of registering an additional data type in the correspondence memory, deleting a data type from the correspondence memory, registering of an additional application in the correspondence memory, deleting of an application from the correspondence memory, and changing inclusion relation information stored in the inclusion relation memory.

4. The information processing apparatus according to claim 2, further comprising:
    a content-of-storage changing unit configured to perform, based on an operation by a user, at least one of registering an additional data type in the correspondence memory, deleting a data type from the correspondence memory, registering of an additional application in the correspondence memory, deleting of an application from the correspondence memory, and changing inclusion relation information stored in the inclusion relation memory.

5. The information processing apparatus according to claim 1, further comprising:
    a versatility information memory configured to store versatility information indicating a level of versatility of each data type of the plurality of related data types, wherein the level of versatility of a data type is proportional to its number of descendants in the tree structure,
    wherein the applications selected for display are selected based on the level of versatility of their respective corresponding data types.

6. The information processing apparatus according to claim 5, wherein the data types corresponding to the selected applications each have a level of versatility greater than or equal to a predetermined threshold.

7. The information processing apparatus according to claim 5,
    wherein the application selected as the default display application is the identified application corresponding to the identified data type.

8. The information processing apparatus according to claim 1,
    wherein the activation display parts comprise buttons.

9. An information processing method for displaying an operation user interface comprising:
    storing correspondence information between a plurality of related data types and a plurality of applications, wherein each data type represents a type of data which may be specified for entry in one or more input areas of a graphical user interface and each application is operable to enter data into the input areas, wherein a correspondence between an application and a data type indicates the application is capable of entering data of that data type;
    storing inclusion relation information of the plurality of related data types in a tree structure, wherein each application which corresponds to a particular data type in the tree is operable to enter data of each data type which is a descendent of the particular data type in the tree in addition to data of the particular data type, and wherein none of the applications correspond to multiple data types that are at more than one level of the tree;
    acquiring information associated with a first input area of the input areas to identify a data type specified by the acquired information;
    identifying the application corresponding to the identified data type and the applications corresponding respectively to the descendants of the identified data type in the tree using the correspondence information and the inclusion relation information;

selecting a subset of the identified applications for display, the selecting comprising selecting one of the identified applications as a default display application and two or more other of the identified applications as sub-display applications; and displaying concurrently display parts for the selected applications including an operation user interface display part of the default display application and an activation display part for each the sub-display applications, wherein display parts for unselected applications are not displayed.

10. The information processing method according to claim 9, further comprising:

performing, based on an operation by a user, at least one of registering an additional data type in the correspondence memory, deleting a data type from the correspondence memory, registering of an additional application in the correspondence memory, deleting of an application from the correspondence memory, and changing inclusion relation information stored in the inclusion-relation memory.

11. The information processing method according to claim 9, further comprising:

activating, in response to a user input selecting one of the activation display parts, the sub-display application corresponding to the selected activation display part, the activating comprising displaying an operation user interface display part of the sub-display application.

12. A non-transitory computer readable medium storing a program which, when executed, causes a computer to perform a process for displaying an operation user interface comprising:

storing correspondence information between a plurality of related data types and a plurality of applications, wherein each data type represents a type of data which may be specified for entry in one or more input areas of a graphical user interface and each application is operable to enter data into the input areas, wherein a correspondence between an application and a data type indicates the application is capable of entering data of that data type;

storing inclusion relation information of the plurality of related data types in a tree structure, wherein each application which corresponds to a particular data type in the tree is operable to enter data of each data type which is a descendent of the particular data type in the tree in addition to data of the particular data type, and wherein none of the applications correspond to multiple data types that are at more than one level of the tree;

acquiring information associated with a first input area of the input areas to identify a data type specified by the acquired information;

identifying the application corresponding to the identified data type and the applications corresponding respectively to the descendants of the identified data type in the tree using the correspondence information and the inclusion relation information;

selecting a subset of the identified applications for display, the selecting comprising selecting one of the identified applications as a default display application and two or more other of the identified applications as sub-display applications; and displaying concurrently display parts for the selected applications including an operation user interface display part of the default display application and an activation display part for each of the sub-display applications, wherein display parts for unselected applications are not displayed.

13. The non-transitory computer readable medium according to claim 12, the process further comprising:

performing, based on an operation by a user, at least one of registering an additional data type in the correspondence memory, deleting a data type from the correspondence memory, registering of an additional application in the correspondence memory, deleting of an application from the correspondence memory, and changing inclusion relation information stored in the inclusion-relation memory.

14. The non-transitory computer readable medium according to claim 12, the process further comprising:

activating, in response to a user input selecting one of the activation display parts, the sub-display application corresponding to the selected activation display part, the activating comprising displaying an operation user interface display part of the sub-display application.

* * * * *